United States Patent
Ko

(10) Patent No.: US 11,263,932 B2
(45) Date of Patent: Mar. 1, 2022

(54) DISPLAY DEVICE

(71) Applicant: Samsung Display Co., LTD., Yongin-si (KR)

(72) Inventor: Seung Cheol Ko, Hwaseong-si (KR)

(73) Assignee: SAMSUNG DISPLAY CO., LTD., Gyeonggi-do (KR)

(*) Notice: Subject to any disclaimer, the term of this patent is extended or adjusted under 35 U.S.C. 154(b) by 30 days.

(21) Appl. No.: 16/926,554

(22) Filed: Jul. 10, 2020

(65) Prior Publication Data
US 2021/0118335 A1    Apr. 22, 2021

(30) Foreign Application Priority Data
Oct. 17, 2019  (KR) .......................... 10-2019-0128863

(51) Int. Cl.
*G09F 9/30*     (2006.01)
*G06F 1/16*     (2006.01)

(52) U.S. Cl.
CPC ............ *G09F 9/301* (2013.01); *G06F 1/1616* (2013.01); *G06F 1/1641* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,782,274 | B2 * | 8/2010 | Manning | G06F 1/1677 345/1.3 |
| 7,965,835 | B2 * | 6/2011 | Park | G06F 1/1626 379/433.13 |
| 8,539,705 | B2 * | 9/2013 | Bullister | G06F 1/1615 40/733 |
| 8,606,340 | B2 * | 12/2013 | Pegg | G06F 1/1641 455/575.4 |
| 9,778,689 | B2 * | 10/2017 | Song | G06F 1/1641 |
| 10,234,902 | B2 * | 3/2019 | Delaporte | G06F 1/1679 |
| 10,599,378 | B2 * | 3/2020 | Choi | H05K 5/0217 |
| 10,893,622 | B2 * | 1/2021 | Zuo | G06F 1/1641 |
| 2005/0164752 | A1 * | 7/2005 | Lau | G06F 1/1666 455/575.3 |
| 2008/0068288 | A1 * | 3/2008 | Henkel | G06F 1/1641 345/1.3 |
| 2017/0192460 | A1 * | 7/2017 | Watanabe | G09F 9/00 |
| 2021/0157357 | A1 * | 5/2021 | Wang | G06F 1/1641 |
| 2021/0216101 | A1 * | 7/2021 | Park | G06F 1/1677 |
| 2021/0263561 | A1 * | 8/2021 | Manning | G06F 1/1652 |

FOREIGN PATENT DOCUMENTS

| KR | 101400284 B1 | 5/2014 |
|---|---|---|
| KR | 1020170122892 A | 11/2017 |
| KR | 1020180123644 A | 11/2018 |
| KR | 1020190049454 A | 5/2019 |

* cited by examiner

*Primary Examiner* — Lisa Lea-Edmonds
(74) *Attorney, Agent, or Firm* — Cantor Colburn LLP

(57) ABSTRACT

A display device includes a display panel which includes a display area which displays an image on a first major surface of the display panel. The display panel includes a first folding portion, a second folding portion, and a third folding portion which are disposed in the display area, and an extension direction of the first folding portion, an extension direction of the second folding portion, and an extension direction of the third folding portion are different from each other.

20 Claims, 22 Drawing Sheets

DISPLAY DEVICE

This application claims priority to Korean Patent Application No. 10-2019-0128863, filed on Oct. 17, 2019, and all the benefits accruing therefrom under 35 U.S.C. § 119, the content of which in its entirety is herein incorporated by reference.

BACKGROUND

1. Field

The present disclosure relates to a display device.

2. Description of the Related Art

Various electronics to which a liquid crystal display ("LCD") or an organic light emitting diode ("OLED") is applied as a display device, such as a mobile phone, a navigation device, a digital camera, an electronic book, a portable game machine, or various terminals, have been in use.

A display device that can be folded multiple times or folded based on various axes so that the shape and size can be freely adjusted has been developed.

SUMMARY

Embodiments are directed to a display device that can be freely folded or unfolded and have reduced power consumption.

A display device according to an embodiment includes a display panel which includes a display area which displays an image on a first major surface of the display panel, where the display panel includes a first folding portion, a second folding portion, and a third folding portion which are disposed in the display area, and an extension direction of the first folding portion, an extension direction of the second folding portion, and an extension direction of the third folding portion are different from each other.

In an embodiment, the display panel may further include a fourth folding portion, a fifth folding portion, and a sixth folding portion which are disposed in the display area, and an extension direction of the fourth folding portion, an extension direction of the fifth folding portion, and an extension direction of the sixth folding portion may be different from each other.

In an embodiment, the display area may include a first area, a second area, a third area, a fourth area, a fifth area, and a sixth area, the first folding portion may be disposed between the first area and the second area, the second folding portion may be disposed between the first area and the third area, the third folding portion may be disposed between the second area and the fourth area, the fourth folding portion may be disposed between the third area and the fifth area, the fifth folding portion may be disposed between the fourth area and the sixth area, and the sixth folding portion may be disposed between the fifth area and the sixth area.

In an embodiment, the display panel may further include a seventh folding portion adjacent to the sixth area, the display area may further include a seventh area that is adjacent to the seventh folding portion, and the seventh folding portion may be disposed between the sixth area and the seventh area.

In an embodiment, the first folding portion may be folded such that the first area and the second area may face outside and do not face each other, the third folding portion may be folded such that the second area and the fourth area may face each other and face inside, and the fifth folding portion may be folded such that the fourth area and the sixth area may face outside and do not face each other.

In an embodiment, the second folding portion may be folded such that the first area and the third area may face outside and do not face each other, the fourth folding portion may be folded such that the third area and the fifth area may face each other and face inside, the sixth folding portion may be folded such that the fifth area and the sixth area may face outside and do not face each other, and the seventh folding portion may be folded such that the sixth area and the seventh area may face each other and face inside.

In an embodiment, while the display panel is in a folded state, the first area may face a front major surface of the display device, and each of the second area, the third area, the fourth area, the fifth area, the sixth area, and the seventh area may face at least one of the second area, the third area, the fourth area, the fifth area, the sixth area, and the seventh area.

The display device according to an embodiment may further include a rack gear and a pinion gear which are disposed on a second major surface of the display panel which may be disposed opposite to the first major surface, and the rack gear and the pinion gear are engaged with each other, and one end of the rack gear may be attached to one corner of a rear major surface of the first area.

The display device according to an embodiment may further include a pinion gear disposed on a second major surface of the display panel and a first rack gear and a second rack gear which are engaged with the pinion gear, where the second major surface may be disposed opposite to the first major surface, the first rack gear may be attached to one corner of a rear major surface of the seventh area and the second rack gear may be attached to one corner of a rear major surface of the first area, and the first rack gear and the second rack gear may move in opposite directions when the pinion gear rotates.

The display device according to an embodiment may further include a wire disposed on a second major surface of the display panel and a pinion gear connected to the wire, where the second major surface may be disposed opposite to the first major surface, the wire may be attached to one corner of a rear major surface of the first area, and when the pinion gear rotates and thus the wire is wound around the pinion gear, the one corner of the first area may be pulled such that the display panel may be unfolded.

The display device according to an embodiment may further include cases disposed at side surfaces of the display panel, where the cases may include a first main case and a second main case that are fixed to side surfaces of the first area of the display panel, a third main case and a fourth main case that are fixed to side surfaces of the seventh area of the display panel, a first sub-case disposed at a side surface of the second area of the display panel while the display panel is in an unfolded state, a second sub-case disposed at a side surface of the third area of the display panel while the display panel is in the unfolded state, a third sub-case disposed at a side surface of the fourth area of the display panel while the display panel is in the unfolded state and a fourth sub-case disposed at a side surface of the display panel while the display panel is in the unfolded state.

In an embodiment, the case may further include a first elastic member connected to one end of the first sub-case, and the first sub-case may be disposed inside the first main case while the display panel is in the folded state.

In an embodiment, the case may further include a first hinge by which the first sub-case is rotatable with respect to the first main case, and, while the display panel is in the folded state, the first sub-case may overlap the first main case in a top plan view of the display device.

In an embodiment, the display area may further include a seventh area disposed on a second major surface which is disposed opposite to the first major surface, while overlapping the first area, and, while the display panel is in the folded state, the seventh area may face toward the front major surface of the display device, and each of the first area, the second area, the third area, the fourth area, the fifth area, and the sixth area may face at least one of the first area, the second area, the third area, the fourth area, the fifth area, and the sixth area.

In an embodiment, the first folding portion may be folded such that the first area and the second area may face each other and face inside, the third folding portion may be folded such that the second area and the fourth area may face outside and do not face each other, and the fifth folding portion may be folded such that the fourth area and the sixth area may face each other and face inside, and the second folding portion may be folded such that the first area and the third area may face each other and face inside, the fourth folding portion may be folded such that the third area and the fifth area may face outside and do not face each other, and the sixth folding portion may be folded such that the fifth area and the sixth area may face each other and face inside.

In an embodiment, the first folding portion may extend in a first direction, the second folding portion may extend in a second direction that is perpendicular to the first direction, and the third folding portion may extend in a direction oblique with respect to the first direction and oblique with respect to the second direction.

A display device according to an embodiment includes a display panel which includes a display area where an image is displayed, wherein the display panel includes a first folding portion, a second folding portion, a third folding portion, a fourth folding portion, a fifth folding portion, and a sixth folding portion that extend from a first dot.

In an embodiment, the display area may include a first area, a second area, a third area, a fourth area, a fifth area, and a sixth area, and the first folding portion may be disposed between the first area and the second area, the second folding portion may be disposed between the first area and the third area, the third folding portion may be disposed between the second area and the fourth area, the fourth folding portion may be disposed between the third area and the fifth area, the fifth folding portion may be disposed between the fourth area and the sixth area, and the sixth folding portion may be disposed between the fifth area and the sixth area.

In an embodiment, the display panel may further include a seventh folding portion adjacent to the sixth area, the display area may further include a seventh area adjacent to the seventh folding portion, and the seventh folding portion may be disposed between the sixth area and the seventh area.

In an embodiment, the first folding portion may be folded such that the first area and the second area may face each other and face inside, the third folding portion may be folded such that the second area and the fourth area may face outside and do not face each other, and the fifth folding portion may be folded such that the fourth area and the sixth area may face each other and face inside.

According to the embodiments, the display device can be freely folded or unfolded, and power consumption can be reduced.

DETAILED DESCRIPTION

Figure 1:
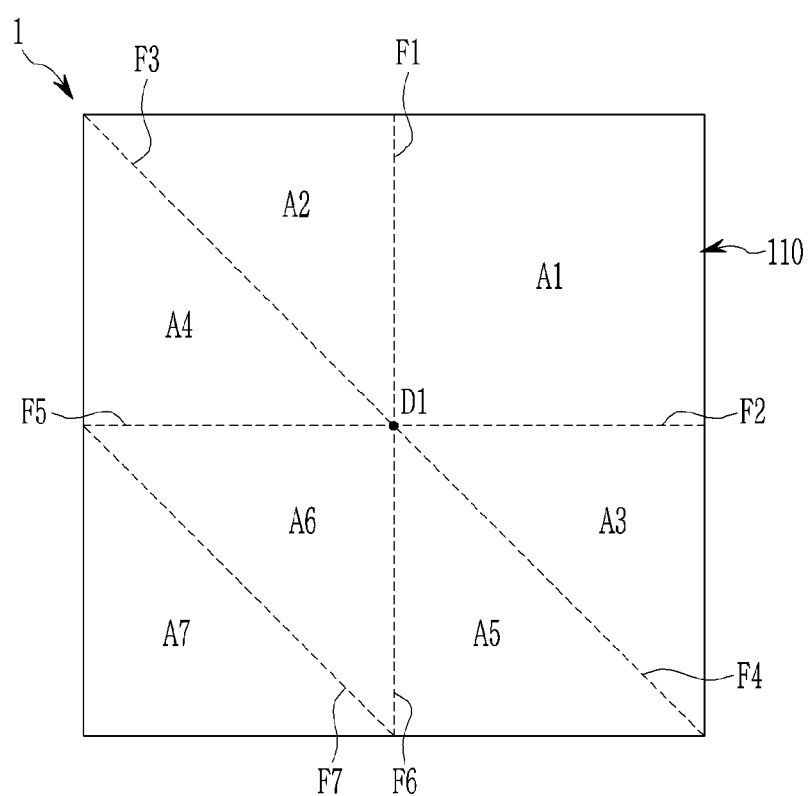
FIG. 1 is a top plan view of a display device in an unfolded state according to an embodiment.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, size and thickness of each element are arbitrarily represented for better understanding and ease of description, but the present invention is not limited thereto. In the drawings, the thickness of layers, films, panels, regions, etc., are exaggerated for clarity. In addition, in the drawing, the thickness of some layers and areas is exaggerated for better understanding and ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

In addition, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

Figure 2:
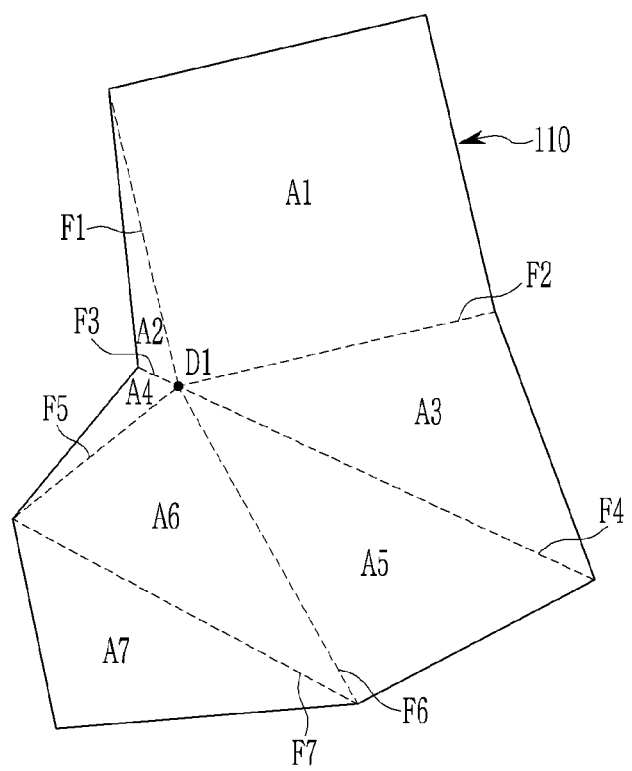
FIG. 2 is a perspective view of the display device in a state of being folded according to the embodiment of FIG. 1.
Figure 3:
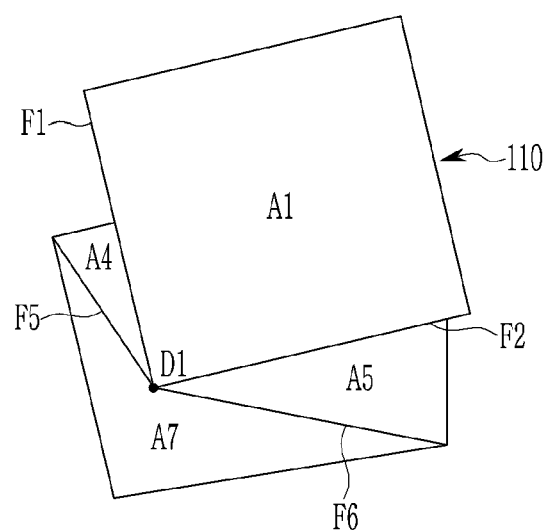
FIG. 3 is a perspective view of the display device in the state of being folded according to the embodiment of FIG. 1.
Figure 4:
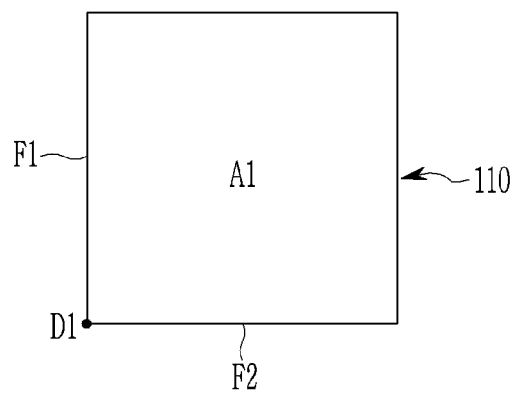
FIG. 4 is a top plan view of the display device in a completely folded state according to the embodiment of FIG. 1.
Figure 5:
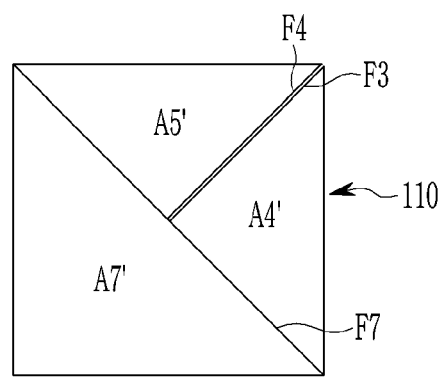
FIG. 5 is a rear view of the display device in the completely folded state according to the embodiment of FIG. 1.

First, a display device according to an embodiment will be described with reference to FIG. 1 to FIG. 5. FIG. 1 is a top plan view of a display device in an unfolded state according to an embodiment. FIG. 2 and FIG. 3 are perspective views of the display device in a state of being folded according to the embodiment. FIG. 4 is a top plan view of the display device in a completely folded state according to the embodiment. FIG. 5 is a rear view of the display device in the completely folded state according to the embodiment.

Referring to FIG. 1, the display device according to an embodiment includes a display panel 110, and a first major surface of the display panel 110 includes a display area that includes pixels to display an image. The display panel 110 of the display device according to the embodiment includes a plurality of folding portions that can be folded.

The plurality of folding portions may include a first folding portion F1, a second folding portion F2, a third folding portion F3, a fourth folding portion F4, a fifth folding portion F5, a sixth folding portion F6, and a seventh folding portion F7. The first folding portion F1, the second folding portion F2, and the third folding portion F3 extend in different directions from each other. For example, the first folding portion F1 may extend in a first direction, the second folding portion F2 may extend in a second direction that is perpendicular to the first direction, and the third folding portion F3 may extend in a direction that is oblique with respect to the first direction and oblique with respect to the second direction. The fourth folding portion F4, the fifth folding portion F5, and the sixth folding portion F6 extend in different directions from each other. The first folding portion F1 and the sixth folding portion F6 may extend in the same direction, the second folding portion F2 and the fifth folding portion F5 may extend in the same direction, and the third folding portion F3, the fourth folding portion F4, and the seventh folding portion F7 may extend in the same direction. However, in another embodiment, the first folding portion F1 and the sixth folding portion F6 may extend in different directions from each other, the second folding portion F2 and the fifth folding portion F5 may extend in different directions from each other, and the fourth folding portion F4 and the seventh folding portion F7 may extend in different directions from each other.

The first folding portion F1, the second folding portion F2, the third folding portion F3, the fourth folding portion F4, the fifth folding portion F5, and the sixth folding portion F6 may meet at a first dot D1. That is, the first folding portion F1, the second folding portion F2, the third folding portion F3, the fourth folding portion F4, the fifth folding portion F5, and the sixth folding portion F6 may extend from the first dot D1. In FIG. 1, the plurality of folding portions F1 to F7 is displayed as lines around which the display area of the display panel 110 is to be folded for convenience of illustration, but the plurality of folding portions F1 to F7 may have constant widths, respectively.

The display area of the display panel 110 includes a first area A1, a second area A2, a third area A3, a fourth area A4, a fifth area A5, a sixth area A6, and a seventh area A7 partitioned by the plurality of folding portions F1 to F7. The first area A1 is adjacent to the first folding portion F1 and the second folding portion F2. The second area A2 is adjacent to the first folding portion F1 and the third folding portion F3, and the third area A3 is adjacent to the second folding portion F2 and the fourth folding portion F4. The fourth area A4 is adjacent to the third folding portion F3 and the fifth folding portion F5, and the fifth area A5 is adjacent to the fourth folding portion F4 and the sixth folding portion F6. The sixth area A6 is adjacent to the fifth folding portion F5, the sixth folding portion F6, and the seventh folding portion F7. The seventh area A7 is adjacent to the seventh folding portion F7.

The first folding portion F1 is disposed between the first area A1 and the second area A2, and the second folding portion F2 is disposed between the first area A1 and the third area A3. The third folding portion F3 is disposed between the second area A2 and the fourth area A4, and the fourth folding portion F4 is disposed between the third area A3 and the fifth area A5. The fifth folding portion F5 is disposed between the fourth area A4 and the sixth area A6, and the sixth folding portion F6 is disposed between the fifth area A5 and the sixth area A6. The seventh folding portion F7 is disposed between the sixth area A6 and the seventh area A7.

When the display device according to the embodiment is an unfolded state, the first area A1, the second area A2, the third area A3, the fourth area A4, the fifth area A5, the sixth area A6, and the seventh area A7 may display an image toward a front major surface of the display device.

Referring to FIG. 2 and FIG. 3, a process of folding the display device according to an embodiment will be described.

In the display device according to the embodiment, the first folding portion F1, the second folding portion F2, the fifth folding portion F5, and the sixth folding portion F6 may be folded around their lines respectively such that the areas of the display area adjacent to these folding portions face outside and therefore do not face each other as shown in FIGS. 2 and 3. That is, the first folding portion F1 may be folded around the line thereof such that the first area A1 and the second area A2 face outside, the second folding portion F2 may be folded around the line thereof such that the third area A3 and the first area A1 face outside, the fifth folding portion F5 may be folded around the line thereof such that the fourth area A4 and the sixth area A6 face outside, and the sixth folding portion F6 may be folded around the line thereof such that the fifth area A5 and the sixth area A6 face outside in the same way with the first folding portion F1.

In the display device according to the embodiment, the third folding portion F3, the fourth folding portion F4, and the seventh folding portion F7 may be folded around their lines respectively such that the areas of the display area adjacent to these folding portions face inside and therefore face each other as shown in FIGS. 2 and 3. That is, the third folding portion F3 may be folded around the line thereof such that the second area A2 and the fourth area A4 face each other, the fourth folding portion F4 may be folded around the line thereof such that the third area A3 and the fifth area A5 face each other, and the seventh folding portion F7 may be folded around the line thereof such that the sixth area A6 and the seventh area A7 face each other.

Referring to FIG. 4 and FIG. 5, a completely folded state of the display device according to the embodiment will be described. Referring to FIG. 4, when the display device according to the embodiment is in the completely folded state, only the first area A1 may display an image toward the outside of the display panel 110. That is, only the first area A1 may be disposed to face the front major surface of the display device. In this case, the second area A2, the third area A3, the fourth area A4, the fifth area A5, the sixth area A6, and the seventh area A7 may not be exposed to the outside. The first folding portion F1 is disposed at one edge (i.e., one side surface) of the first area A1, and the second folding portion F2 is disposed at another edge (i.e., another side surface) of the first area A1 which meet the one edge at the first dot D1.

Referring to FIG. 5, a rear major surface A4' of the fourth area F4, a rear major surface A5' of the fifth area A5, and a rear major surface A7' of the seventh area A7 disposed at a second major surface (i.e., rear major surface) of the display panel 110, may face toward the rear major surface of the display device while the display device is in the completely folded state.

The display device according to the embodiment includes the plurality of folding portions F1 to F7 such that they can be freely folded or unfolded. In addition, the area of the display area displaying an image in the completely folded state of the display device is only one quarter of the area of the display area displaying an image in the unfolded state of the display device, thereby reducing power consumption.

Figure 6:
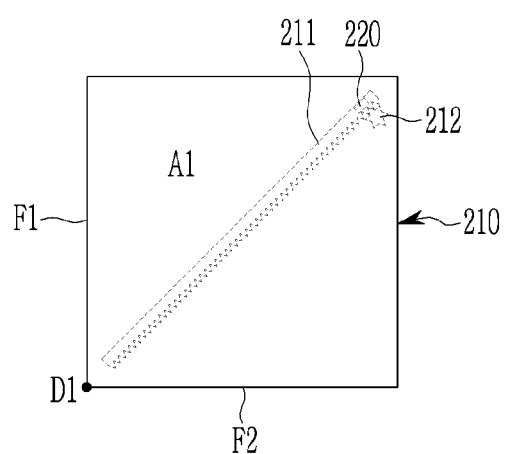
FIG. 6 is a top plan view of a display device according to another embodiment in a folded state.
Figure 7:
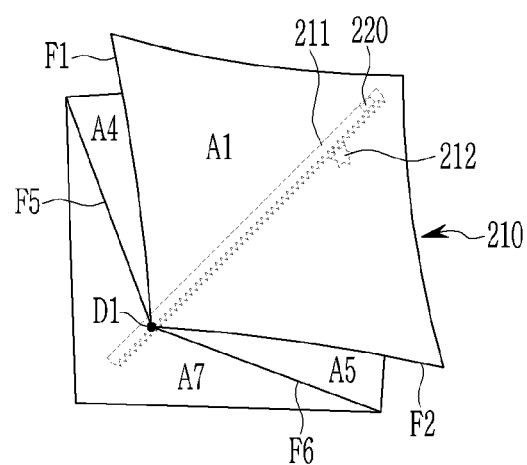
FIG. 7 is a perspective view of a display device according to the embodiment of FIG. 6 in the state of being unfolded.
Figure 8:
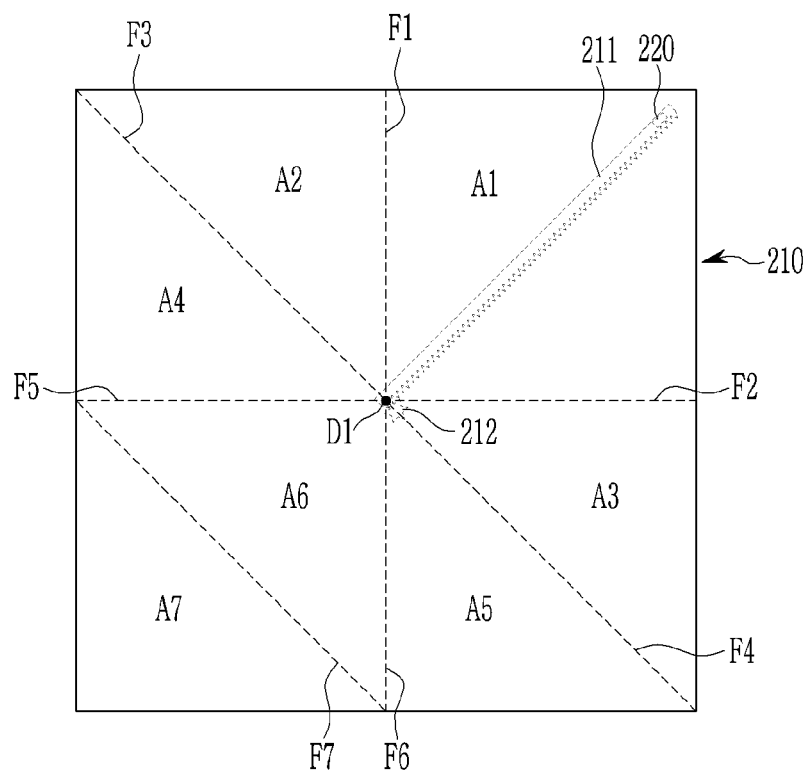
FIG. 8 is a top plan view of the display device according to the embodiment of FIG. 6 in an unfolded state.

Hereinafter, a display device according to another embodiment will be described with reference to FIG. 6 to FIG. 8. FIG. 6 is a top plan view of a display device according to another embodiment in a completely folded state. FIG. 7 is a perspective view of the display device according to the embodiment in a state of being unfolded. FIG. 8 is a top plan view of the display device according to the embodiment in an unfolded state.

Referring to FIG. 6 to FIG. 8, a display device according to an embodiment includes a rack gear 211 and a pinion gear 212. The rack gear 211 and the pinion gear 212 are disposed below a second major surface (i.e., rear major surface) of a display panel 210 which is disposed opposite to a first major surface of the display panel 210. One end of the rack gear 211 may be attached to one corner of a rear major surface of a first area A1 by an adhesive member 220. In other embodiments, the rack gear 211 may be replaced with a worm gear.

The teeth of the rack gear 211 and the teeth of the pinion gear 212 are engaged with each other. When the pinion gear 212 rotates, the rack gear 211 linearly moves. In this case, one corner of the rear major surface of the first area A1 attached to one end of the rack gear 211 may move along the movement direction of the rack gear 211. Accordingly, the display device is folded or unfolded by the rotary movement of the pinion gear 212.

The one end of the rack gear 211 is attached only to the one corner of the rear major surface of the first area A1, and the rest of the rack gear 211 is not attached to the display panel 210. In a transitional process of folding or unfolding the display device, the first area A1, a second area A2, a third area A3, a fourth area A4, a fifth area A5, a sixth area A6, and a seventh area A7 of the display device are flexible and thus may be partially bent or folded.

Figure 9:
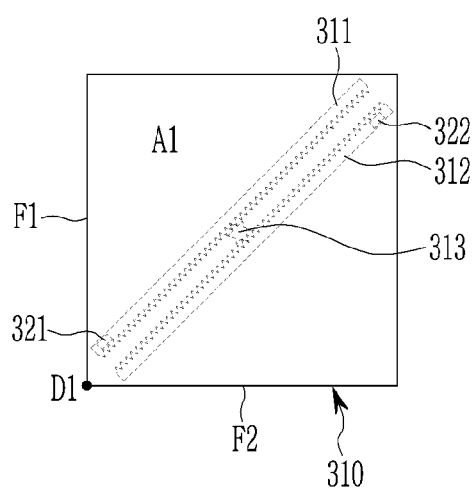
FIG. 9 is a top plan view of a display device according to still another embodiment in a folded state.
Figure 10:
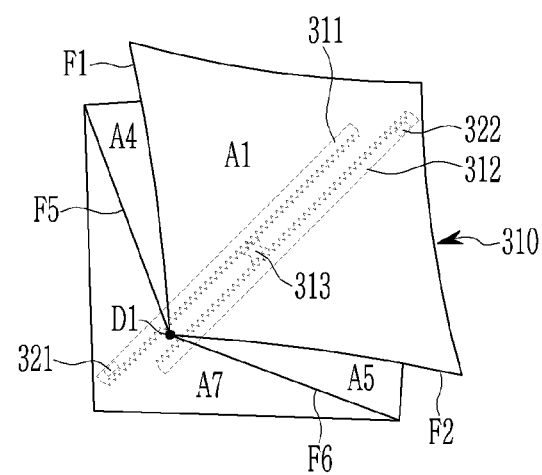
FIG. 10 is a perspective view of the display device according to the embodiment of FIG. 9 in a state of being unfolded.
Figure 11:
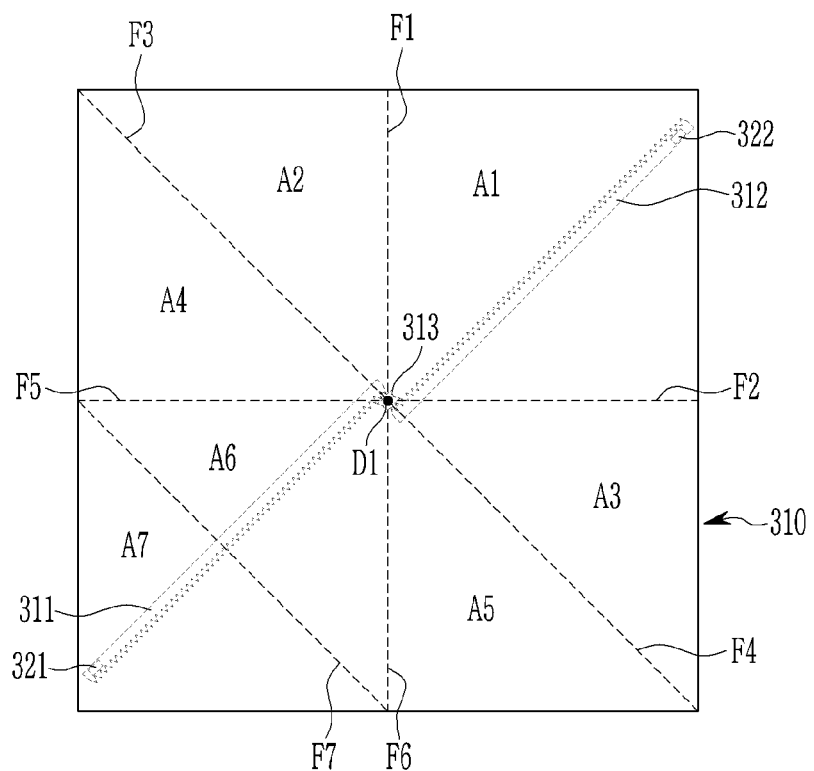
FIG. 11 is a top plan view of the display device according to the embodiment of FIG. 9 in an unfolded state.

Hereinafter, a display device according to still another embodiment will be described with reference to FIG. 9 to FIG. 11. FIG. 9 is a top plan view of a display device according to still another embodiment in a folded state. FIG. 10 is a perspective view of the display device according to the embodiment in a state of being unfolded. FIG. 11 is a top plan view of the display device according to the embodiment in an unfolded state.

Referring FIG. 9 to FIG. 11, a display device according to an embodiment includes a first rack gear 311, a second rack gear 312, and a pinion gear 313. The first rack gear 311, the second rack gear 312, and the pinion gear 313 are disposed below a second major surface of a display panel 310, which is disposed opposite to a first major surface of the display panel 310. One end of the first rack gear 311 may be bonded to one corner of the rear major surface of the seventh area A7 by a first adhesive member 321 as shown in FIG. 11. One end of the second rack gear 312 may be attached to one corner of the rear major surface of the first area A1 by a second adhesive member 322.

The teeth of the first rack gear 311 and the teeth of the pinion gear 313 are engaged with each other, and the teeth of the second rack gear 312 and the teeth of the pinion gear 313 are engaged with each other. When the pinion gear 313 rotates, the first rack gear 311 and the second rack gear 312 linearly move in opposite directions from each other. In this case, the one corner of the seventh area A7 attached to the one end of the first rack gear 311 moves along the movement direction of the first rack gear 311, and the one end of the first area A1 attached to the one end of the second rack gear 312 moves along the movement direction of the second rack gear 312. Accordingly, the display device can be folded or unfolded by the rotary movement of the pinion gear 313.

Figure 12:
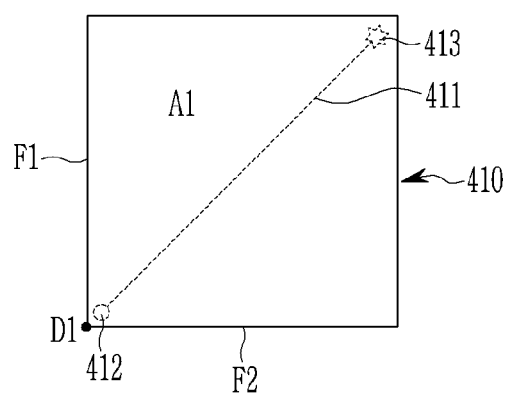
FIG. 12 is a top plan view of a display device according to yet another embodiment in a folded state.
Figure 13:
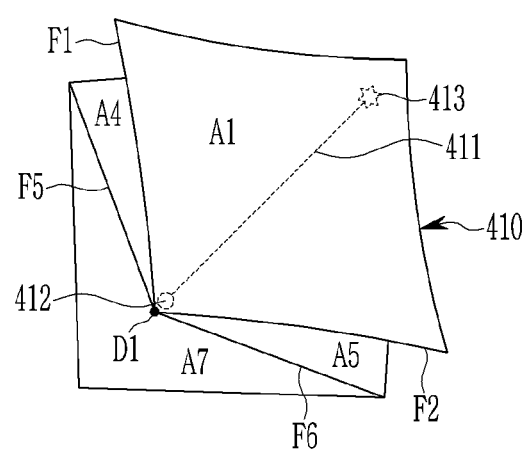
FIG. 13 is a perspective view of the display device according to the embodiment of FIG. 12 in a state of being unfolded.
Figure 14:
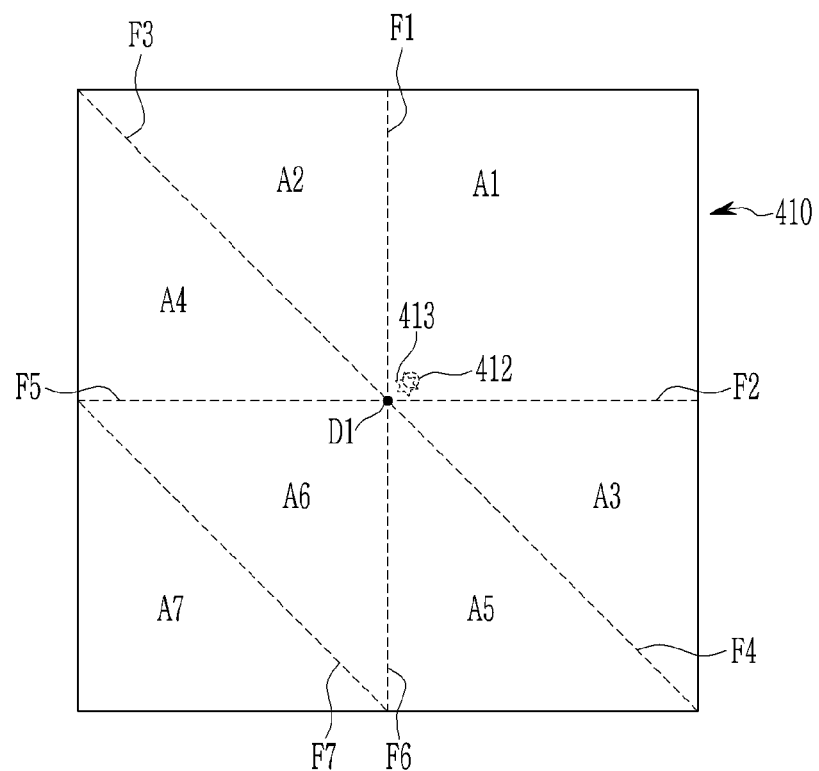
FIG. 14 is a top plan view of the display device according to the embodiment of FIG. 12 in an unfolded state.

Hereinafter, referring to FIG. 12 to FIG. 14, a display device according to yet another embodiment will be described. FIG. 12 is a top plan view of a display device according to yet another embodiment in a folded state. FIG. 13 is a perspective view of the display device according to the embodiment in a state of being unfolded. FIG. 14 is a top plan view of the display device according to the embodiment in an unfolded state.

Referring to FIG. 12 to FIG. 14, a display device according to an embodiment includes a wire 411 and a pinion gear 413 that are disposed below a second major surface of a display panel 410. One end of the wire 411 is attached to one corner of a rear major surface of a first area A1 by an adhesive member 412, and the other end of the wire 411 is wound round the pinion gear 413. When the pinion gear 413 rotates, the wire 411 is wound around the pinion gear 413 and then the display panel 410 pulls one corner of the first area A1 such that the display panel 410 can be unfolded.

Figure 15:
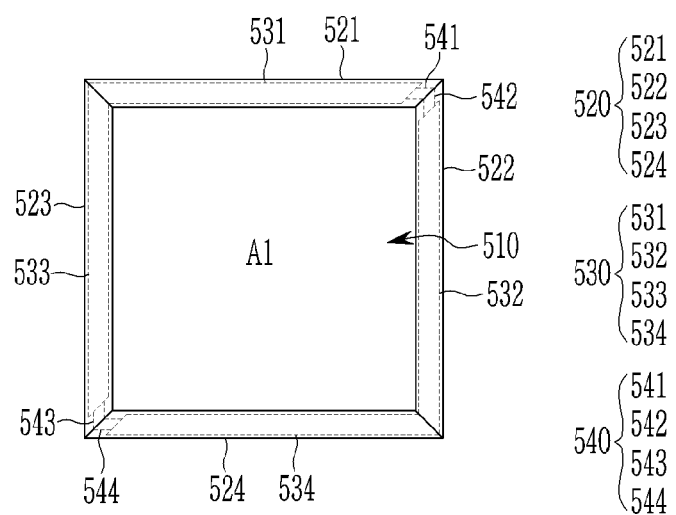
FIG. 15 is a top plan view of a display device according to another embodiment in a folded state.
Figure 16:
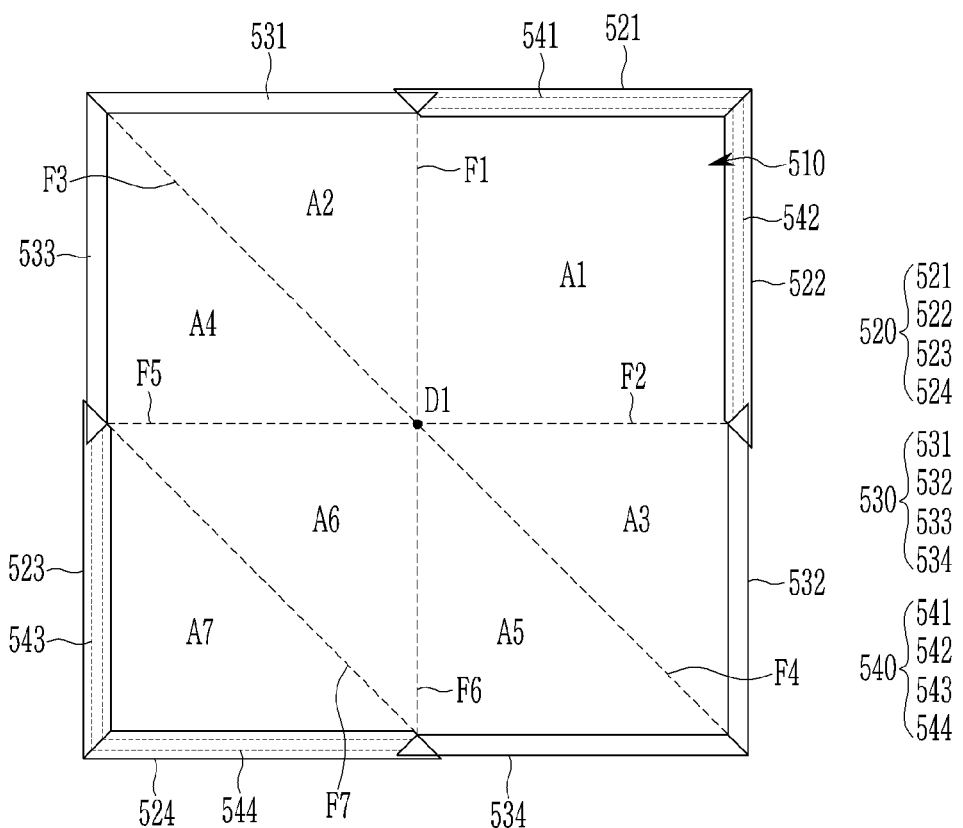
FIG. 16 is a top plan view of the display device according to the embodiment of FIG. 15 in an unfolded state.
Figure 17:
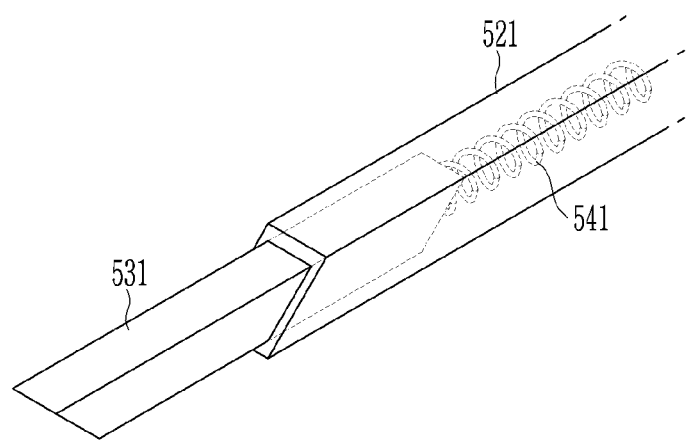
FIG. 17 is a perspective view of a first main case and a first sub-case according to the embodiment of FIG. 15.

Hereinafter, a display device according to another embodiment will be described with reference to FIGS. 15 to 17. FIG. 15 is a top plan view of a display device according to another embodiment in a folded state. FIG. 16 is a top plan view of the display device according to the embodiment in an unfolded state. FIG. 17 is a perspective view of a first main case and a first sub-case according to the embodiment.

Referring to FIG. 15 to FIG. 17, a display device according to an embodiment includes a display panel 510, and cases 520 and 530 that are disposed at side surfaces of the display panel 510 to protect the display panel 510.

Referring to FIG. 15 to FIG. 17, the cases 520 and 530 include a main case 520 that surrounds the display panel 510 and is disposed outside the sub-case 530 while the display panel 510 is in a folded state, the sub-case 530 that is disposed inside the main case 520 while the display panel 510 is in the folded state, and an elastic member 540 that is disposed at one end of the sub-case 530. The main case 520 includes a first main case 521, a second main case 522, a third main case 523, and a fourth main case 524 that surround a first area A1 of the display panel 510 while the display panel 510 is in the folded state. In this instance, the first main case 521 and the second main case 522 are fixed to side surfaces of the first area A1 of the display panel 510, and the third main case 523 and the fourth main case 524 are fixed to side surfaces of a seventh area A7 of the display panel 510.

The sub-case 530 includes a first sub-case 531 that is disposed inside the first main case 521, a second sub-case 532 that is disposed inside the second main case 522, a third sub-case 533 that is disposed inside the third main case 523, and a fourth sub-case 534 that is disposed inside the fourth main case 524, while the display panel 510 is in the folded state.

The elastic member 540 includes a first elastic member 541 connected to one end of the first sub-case 531, a second elastic member 542 connected to one end of the second sub-case 532, a third elastic member 543 connected to one end of the third sub-case 533, and a fourth elastic member 544 connected to one end of the fourth sub-case 534. The elastic member 540 may be an elastic body such as a spring.

When the display panel 510 is unfolded, the sub-case 530 is discharged to the outside of the main case 520 by the restoring force of the elastic member 540 to return to its original shape.

When the display panel 510 is in an unfolded state, the first main case 521 is disposed at one side of the first area A1, the second main case 522 is disposed at another side of the first area A1, the third main case 523 is disposed at one side of the seventh area A7, and the fourth main case 524 is disposed at another side of the seventh area A7. In addition, the first sub-case 531 is disposed at one side of a second area A2, the second sub-case 532 is disposed at one side of a third area A3, the third sub-case 533 is disposed at one side of a fourth area A4, and the fourth sub-case 534 is disposed at one side of a fifth area A5.

Figure 18:
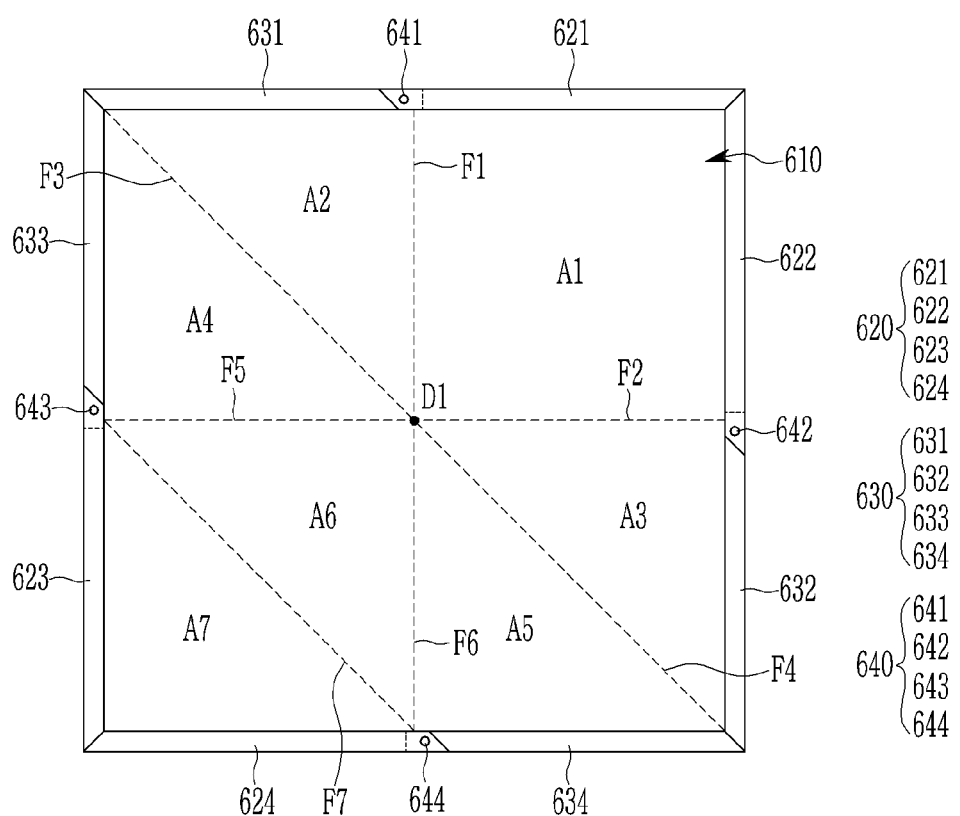
FIG. 18 is a top plan view of a display device according to still another embodiment in an unfolded state.
Figure 19:
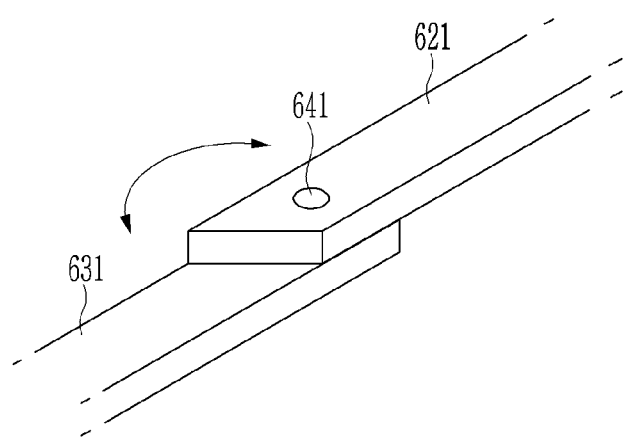
FIG. 19 is a perspective view of a first main case and a first sub-case according to the embodiment of FIG. 18.

Hereinafter, a display device according to still another embodiment will be described with reference to FIG. 18 and FIG. 19. FIG. 18 is a top plan view of a display device according to still another embodiment in an unfolded state. FIG. 19 is a perspective view of a first main case and a first sub-case of the embodiment.

Referring to FIG. 18 and FIG. 19, a display device according to an embodiment includes a display panel 610, and cases 620 and 630 that protect the display panel 610 by being disposed at side surfaces of the display panel 610.

Referring FIG. 18 and FIG. 19, the cases 620 and 630 include a main case 620 that surrounds a first area A1 of the display panel 610 and disposed over a sub-case 630 while the display panel 610 is in a folded state, the sub-case 630 that is disposed under the main case 620 while the display panel 610 is in the folded state, and a hinge 640 that enables the sub-case 630 to be rotatable with respect to the main case 620. The main case 620 includes a first main case 621, a second main case 622, a third main case 623, and a fourth main case 624 that surround the first area A1 of the display panel 610 while the display panel 610 is in the folded state. In this case, the first main case 621 and the second main case 622 are attached to side surfaces of the first area A1 of the display panel 610, and the third main case 623 and the fourth main case 624 are attached to side surfaces of a seventh area A7 of the display panel 610.

The sub-case 630 includes a first sub-case 631 that overlaps the first main case 621, a second sub-case 632 that overlaps the second main case 622, a third sub-case 633 that overlaps the third main case 623, and a fourth sub-case 634 that overlaps the fourth main case 624 in the top plan view of the display device, while the display panel 610 is in the folded state.

The hinge 640 includes a first hinge 641 that movably couples the first main case 621 and the first sub-case 631, a second hinge 642 that movably couples second main case 622 and the second sub-case 632, a third hinge 643 that movably couples the third main case 623 and the third sub-case 633, and a fourth hinge 644 that movably couples the fourth main case 624 and the fourth sub-case 634.

The sub-case 630 overlaps the main case 620 while the display panel 610 is in the folded state, and when the display panel 610 is unfolded, the sub-case 630 rotates with respect to a rotation axis of the hinge 640 and thus may be located in an extension direction of the main case 620.

The first main case 621 is disposed at one side of a first area A1, the second main case 622 is disposed at another side of the first area A1, the third main case 623 is disposed at one side of the seventh area A7, and the fourth main case 624 is disposed at another side of the seventh area A7, while the display panel 610 is in the unfolded state. In addition, the first sub-case 631 is disposed at one side of the second area A2, the second sub-case 632 is disposed at one side of the third area A3, the third sub-case 633 is disposed at one side of the fourth area A4, and the fourth sub-case 634 is disposed at one side of the fifth area A5, while the display panel 610 is in the unfolded state.

Figure 20:
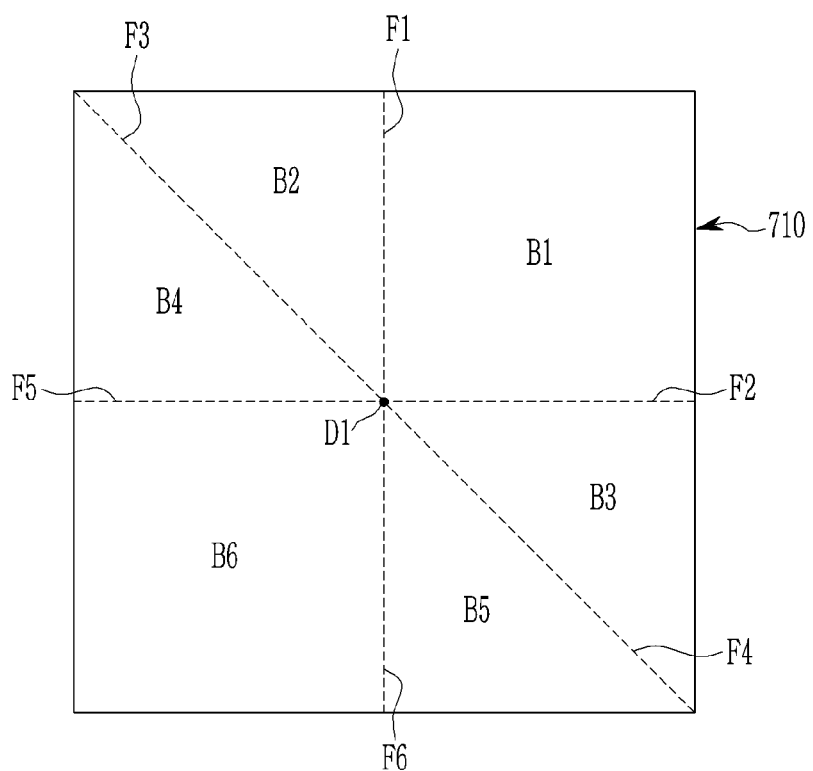
FIG. 20 is a top plan view of a display device according to yet another embodiment in an unfolded state.
Figure 21:
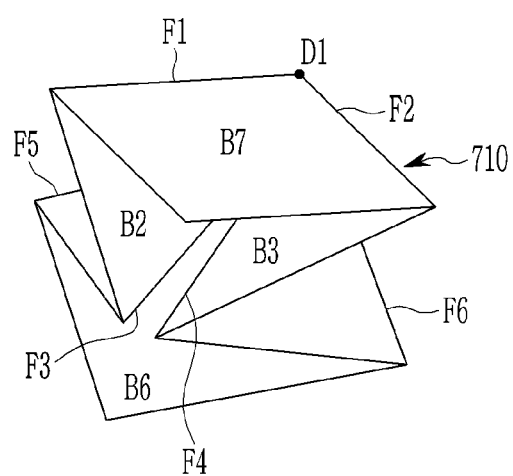
FIG. 21 is a perspective view of the display device according to the embodiment of FIG. 20 in a state of being folded.
Figure 22:
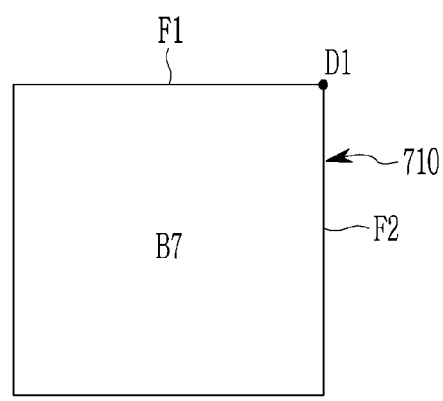
FIG. 22 is a top plan view of the display device according to the embodiment of FIG. 20 in a folded state.

Hereinafter, a display device according to yet another embodiment will be described with reference to FIG. 20 to FIG. 22. FIG. 20 is a top plan view of a display device according to yet another embodiment in an unfolded state. FIG. 21 is a perspective view of the display device according to the embodiment in a state of being folded. FIG. 22 is a top plan view of the display device according to the embodiment in a folded state.

Referring to FIG. 20, a display device according to an embodiment includes a display panel 710, and the display panel 710 includes a first major surface and a second major surface that is disposed opposite to the first major surface. The display panel 710 includes a display area that includes pixels for displaying an image. The display panel 710 of the display device according to the embodiment includes a plurality of folding portions F1 to F6 that can be folded.

The plurality of folding portions includes a first folding portion F1, a second folding portion F2, a third folding portion F3, a fourth folding portion F4, a fifth folding portion F5, and a sixth folding portion F6. The first folding portion F1, the second folding portion F2, and the third folding portion F3 extend in different directions from each other. The fourth folding portion F4, the fifth folding portion F5, and the sixth folding portion F6 extend in different directions from each other. The first folding portion F1 and the sixth folding portion F6 may extend in the same direction, the second folding portion F2 and the fifth folding portion F5 may extend in the same direction, and the third folding portion F3 and the fourth folding portion F4 may extend in the same direction. The first folding portion F1, the second folding portion F2, the third folding portion F3, the fourth folding portion F4, the fifth folding portion F5, and the sixth folding portion F6 may meet at a first dot D1. That is, the first folding portion F1, the second folding portion F2, the third folding portion F3, the fourth folding portion F4, the fifth folding portion F5, and the sixth folding portion F6 may extend from the first dot D1. The plurality of folding portions F1 to F6 is illustrated as lines around which the display area of the display panel 710 is to be folded for convenience of illustration in FIG. 20, but the plurality of folding portions may have a constant width, respectively.

The display area of the display panel 710 is disposed both in the first major surface and the second major surface of the display panel 710. The display area includes a first area B1, a second area B2, a third area B3, a fourth area B4, a fifth area B5, and a sixth area B6 that are disposed on the first major surface of the display panel 710 and partitioned by the plurality of folding portions. In addition, the display area also includes a seventh area B7 that is disposed on the second major surface of the display panel 710 and overlaps the first area B1. The first area B1 may display an image toward the front major surface (i.e., the first major surface) of the display panel 710, and the seventh area B7 may display an image toward the rear major surface (i.e., the second major surface) of the display panel 710 in the unfolded state. The first area B1 is adjacent to the first folding portion F1 and the second folding portion F2. The second area B2 is adjacent to the first folding portion F1 and the third folding portion F3, and the third area B3 is adjacent to the second folding portion F2 and the fourth folding portion F4. The fourth area B4 is adjacent to the third folding portion F3 and the fifth folding portion F5, and the fifth area B5 is adjacent to the fourth folding portion F4 and the sixth folding portion F6. The sixth area B6 is adjacent to the fifth folding portion F5 and the sixth folding portion F6.

The first folding portion F1 is disposed between the first area B1 and the second area B2, and the second folding portion F2 is disposed between the first area B1 and the third area B3. The third folding portion F3 is disposed between the second area B2 and the fourth area B4, and the fourth folding portion F4 is disposed between the fifth area B5 and the third area B3. The fifth folding portion F5 is disposed between the fourth area B4 and the sixth area B6, and the sixth folding portion F6 is disposed between the fifth area B5 and the sixth area B6.

While the display device according to the embodiment is in the unfolded state, the first area B1, the second area B2, the third area B3, the fourth area B4, the fifth area B5, and the sixth area B6 may display an image toward the front major surface of the display device.

A transitional process of folding the display device according to the embodiment will be described with reference to FIG. 21.

In the display device according to the embodiment, the first folding portion F1 may be folded around line thereof such that the first area B1 and the second area B2 face each other and therefore face inside as shown in FIG. 21, and the second folding portion F2 may be folded around line thereof such that the first area B1 and the third area B3 face each other. The third folding portion F3 may be folded around line thereof such that the second area B2 and the fourth area B4 face outside, and the fourth folding portion F4 may be folded around line thereof such that the third area B3 and the fifth area B5 face outside and therefore do not face each other as shown in FIG. 21. The fifth folding portion F5 may be folded around line thereof such that the fourth area B4 and the sixth area B6 face each other, and the sixth folding portion F6 may be folded around line thereof such that the fifth area B5 and the sixth area B6 face each other and therefore face inside as shown in FIG. 21.

Referring to FIG. 22, a completely folded state of the display device according to the embodiment will be described. Referring to FIG. 22, while the display device according to the embodiment is in the completely folded state, only the seventh area B7 can display an image toward the outside of the display panel 710. That is, only the seventh area B7 may be located to face toward the front major surface of the display device. In this case, the first area B1, the second area B2, the third area B3, the fourth area B4, the fifth area B5, and the sixth area B6 may not be exposed to the outside. The seventh area B7 may be disposed at the rear major surface of the first area B1. The first folding portion F1 is disposed at one edge (i.e., one side surface) of the seventh area B7, and the second folding portion F2 is disposed at another edge (i.e., another side surface) of the seventh area B7 at the completely folded state.

While this disclosure has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

<Description of symbols>

| | |
|---|---|
| 110, 210, 310, 410, 510, 610, 710: display panel | |
| 211: rack gear | 212, 313, 413: pinion gear |
| 220, 412: adhesive member | 311: first rack gear |
| 312: second rack gear | 321: first adhesive member |
| 322: second adhesive member | 411: wire |
| 520, 620: main case | 530, 630: sub-case |
| 540: elastic member | 640: hinge |

What is claimed is:
1. A display device, comprising:
a display panel which includes a display area which displays an image on a first major surface of the display panel,
wherein the display panel comprises a first folding portion, a second folding portion, and a third folding portion which are disposed in the display area, and
an extension direction of the first folding portion, an extension direction of the second folding portion, and an extension direction of the third folding portion are different from each other.

2. The display device of claim 1, wherein the display panel further comprises a fourth folding portion, a fifth folding portion, and a sixth folding portion which are disposed in the display area, and an extension direction of the fourth folding portion, an extension direction of the fifth folding portion, and an extension direction of the sixth folding portion are different from each other.

3. The display device of claim 2, wherein the display area comprises a first area, a second area, a third area, a fourth area, a fifth area, and a sixth area, the first folding portion is disposed between the first area and the second area, the second folding portion is disposed between the first area and the third area, the third folding portion is disposed between the second area and the fourth area, the fourth folding portion is disposed between the third area and the fifth area, the fifth folding portion is disposed between the fourth area and the sixth area, and the sixth folding portion is disposed between the fifth area and the sixth area.

4. The display device of claim 3, wherein the display panel further comprises a seventh folding portion adjacent to the sixth area, the display area further comprises a seventh area that is adjacent to the seventh folding portion, and the seventh folding portion is disposed between the sixth area and the seventh area.

5. The display device of claim 4, wherein the first folding portion is folded such that the first area and the second area face outside and do not face each other, the third folding portion is folded such that the second area and the fourth area face each other and face inside, and the fifth folding portion is folded such that the fourth area and the sixth area face outside and do not face each other.

6. The display device of claim 5, wherein the second folding portion is folded such that the first area and the third area face outside and do not face each other, the fourth folding portion is folded such that the third area and the fifth area face each other and face inside, the sixth folding portion is folded such that the fifth area and the sixth area face outside and do not face each other, and the seventh folding portion is folded such that the sixth area and the seventh area face each other and face inside.

7. The display device of claim 6, wherein, while the display panel is in a folded state, the first area faces a front major surface of the display device, and each of the second area, the third area, the fourth area, the fifth area, the sixth area, and the seventh area faces at least one of the second area, the third area, the fourth area, the fifth area, the sixth area, and the seventh area.

8. The display device of claim 7, further comprising a rack gear and a pinion gear which are disposed on a second major surface of the display panel which is disposed opposite to the first major surface, the rack gear and the pinion gear being engaged with each other, and one end of the rack gear is attached to one corner of a rear major surface of the first area.

9. The display device of claim 7, further comprising a pinion gear disposed on a second major surface of the display panel and a first rack gear and a second rack gear which are engaged with the pinion gear, the second major surface being disposed opposite to the first major surface, wherein the first rack gear is attached to one corner of a rear major surface of the seventh area and the second rack gear is attached to one corner of a rear major surface of the first area, and the first rack gear and the second rack gear move in opposite directions when the pinion gear rotates.

10. The display device of claim 7, further comprising a wire disposed on a second major surface of the display panel and a pinion gear connected to the wire, the second major surface being disposed opposite to the first major surface wherein the wire is attached to one corner of a rear major surface of the first area, and when the pinion gear rotates and thus the wire is wound around the pinion gear, the one corner of the first area is pulled such that the display panel is unfolded.

11. The display device of claim 7, further comprising cases disposed at side surfaces of the display panel, wherein the cases comprise:

a first main case and a second main case that are fixed to side surfaces of the first area of the display panel;

a third main case and a fourth main case that are fixed to side surfaces of the seventh area of the display panel;

a first sub-case disposed at a side surface of the second area of the display panel while the display panel is in an unfolded state;

a second sub-case disposed at a side surface of the third area of the display panel while the display panel is in the unfolded state;

a third sub-case disposed at a side surface of the fourth area of the display panel while the display panel is in the unfolded state; and a fourth sub-case disposed at a side surface of the display panel while the display panel is in the unfolded state.

12. The display device of claim 11, wherein the case further comprises a first elastic member connected to one end of the first sub-case, and the first sub-case is disposed inside the first main case while the display panel is in the folded state.

13. The display device of claim 11, wherein the case further comprises a first hinge by which the first sub-case is rotatable with respect to the first main case, and while the display panel is in the folded state, the first sub-case overlaps the first main case in a top plan view of the display device.

14. The display device of claim 3, wherein the display area further comprises a seventh area disposed on a second major surface which is disposed opposite to the first major surface, while overlapping the first area, and while the display panel is in a folded state, the seventh area faces toward a front major surface of the display device, and each of the first area, the second area, the third area, the fourth area, the fifth area, and the sixth area faces at least one of the first area, the second area, the third area, the fourth area, the fifth area, and the sixth area.

15. The display device of claim 14, wherein the first folding portion is folded such that the first area and the second area face each other and face inside, the third folding portion is folded such that the second area and the fourth area face outside and do not face each other, and the fifth folding portion is folded such that the fourth area and the sixth area face each other and face inside, and the second folding portion is folded such that the first area and the third area face each other and face inside, the fourth folding portion is folded such that the third area and the fifth area face outside and do not face each other, and the sixth folding portion is folded such that the fifth area and the sixth area face each other and face inside.

16. The display device of claim 1, wherein
the first folding portion extends in a first direction,
the second folding portion extends in a second direction that is perpendicular to the first direction, and
the third folding portion extends in a direction oblique with respect to the first direction and oblique with respect to the second direction.

17. A display device, comprising:
a display panel which includes a display area where an image is displayed,
wherein the display panel comprises a first folding portion, a second folding portion, a third folding portion, a fourth folding portion, a fifth folding portion, and a sixth folding portion that extend from a first dot.

18. The display device of claim 17, wherein the display area comprises a first area, a second area, a third area, a fourth area, a fifth area, and a sixth area, and
the first folding portion is disposed between the first area and the second area, the second folding portion is disposed between the first area and the third area, the third folding portion is disposed between the second area and the fourth area, the fourth folding portion is disposed between the third area and the fifth area, the fifth folding portion is disposed between the fourth area and the sixth area, and the sixth folding portion is disposed between the fifth area and the sixth area.

19. The display device of claim 18, wherein the display panel further comprises a seventh folding portion adjacent to the sixth area,
the display area further comprises a seventh area adjacent to the seventh folding portion, and
the seventh folding portion is disposed between the sixth area and the seventh area.

20. The display device of claim 18, wherein the first folding portion is folded such that the first area and the second area face each other and face inside, the third folding portion is folded such that the second area and the fourth area face outside and do not face each other, and the fifth folding portion is folded such that the fourth area and the sixth area face each other and face inside.

\* \* \* \* \*